(12) United States Patent
Oh

(10) Patent No.: US 12,102,152 B2
(45) Date of Patent: Oct. 1, 2024

(54) DESIGNING GARMENT USING STYLE LINE

(71) Applicant: CLO Virtual Fashion Inc., Seoul (KR)

(72) Inventor: Seung Woo Oh, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 212 days.

(21) Appl. No.: 17/668,726

(22) Filed: Feb. 10, 2022

(65) Prior Publication Data

US 2022/0361613 A1 Nov. 17, 2022

(30) Foreign Application Priority Data

May 12, 2021 (KR) .......................... 10-2021-0061621

(51) Int. Cl.
*A41H 3/00* (2006.01)
*G06F 30/20* (2020.01)
*G06F 113/12* (2020.01)

(52) U.S. Cl.
CPC .............. *A41H 3/007* (2013.01); *G06F 30/20* (2020.01); *G06F 2113/12* (2020.01)

(58) Field of Classification Search
CPC ......... A41H 3/007; G06T 19/00; G06F 30/00; G06F 30/12; G06F 30/20
USPC ....................................................... 700/132
See application file for complete search history.

(56) References Cited

U.S. PATENT DOCUMENTS

| 2001/0026272 A1* | 10/2001 | Feld | A41H 3/007 345/585 |
| 2007/0198118 A1* | 8/2007 | Lind | A41H 3/007 700/138 |
| 2014/0114620 A1* | 4/2014 | Grinspun | A41H 3/007 703/1 |

FOREIGN PATENT DOCUMENTS

| EP | 2458561 A2 | 5/2012 |
| JP | H10134095 A | 5/1998 |
| JP | 2003336119 A | 11/2003 |
| JP | 2017058918 A | 3/2017 |
| KR | 10-2008-0063070 A | 7/2008 |
| KR | 10-0999348 B1 | 12/2010 |

OTHER PUBLICATIONS

Meng, Y. et al., "Computer aided clothing pattern design with 3D editing and pattern alteration," Computer-Aided Design, vol. 44, Aug. 2012, pp. 721-734.

(Continued)

*Primary Examiner* — Nathan E Durham
(74) *Attorney, Agent, or Firm* — WTA Patents

(57) ABSTRACT

According to an example embodiment, a method and an apparatus for simulating a garment may receive, through a user interface expressing a three-dimensional (3D) garment, an input of deforming at least one style line among a plurality of style lines representing a style of the 3D garment, identify a first line corresponding to the style line among a plurality of lines included in a two-dimensional (2D) pattern corresponding to the 3D garment, deform the first line based on the input, deform the 2D pattern by propagating deformation of the first line to candidate lines associated with the first line, and output at least one of the deformed 2D pattern and the 3D garment in which the style line is deformed based on the deformed 2D pattern.

25 Claims, 14 Drawing Sheets

(56) References Cited

OTHER PUBLICATIONS

Wang, J. et al., "Interactive 3D garment design with constrained contour curves and style curves," Computer-Aided Design, vol. 41, Sep. 2009, pp. 614-625.

Zhang, D. et al., "An integrated method of 3D garment design," The Journal of the Textile Institute, vol. 109, No. 12, Feb. 2018, pp. 1595-1605.

\* cited by examiner

DESIGNING GARMENT USING STYLE LINE

CROSS-REFERENCE TO RELATED APPLICATION

This application claims priority to and the benefit of Korean Patent Application No. 10-2021-0061621, filed on May 12, 2021, the disclosure of which is incorporated herein by reference.

BACKGROUND

1. Field of the Invention

One or more example embodiments relate to a method and an apparatus for simulating a garment.

2. Description of the Related Art

Garments appear in three dimensions when worn on a person's body, but they are made of two-dimensional fabric pieces cut according to a two-dimensional pattern. Because fabric is flexible, its appearance may vary according to a shape of the person wearing the garment or a motion of the person wearing the garment. For example, when deforming style lines such as cutting lines and/or sewing lines of various shapes to reflect changes in design elements on a garment, the change may also be reflected on lines of other patterns affected by the deformed lines. However, it is not easy to reflect the change of the style line on the lines of the other patterns.

SUMMARY

Embodiments relate to simulating of a garment that is modified by a style line. The style line represents a line on a 3D (three-dimensional) garment for manipulation by user input to modify a shape of the 3D garment. An input indicative of deformation of the style line is received. A first line corresponding to the style line among a plurality of lines in a two-dimensional (2D) pattern of the 3D garment. The first line in the 2D pattern is deformed according to the received input. Deformation in line with the deformation of the first line is propagated to candidate lines associated with the first line. A deformed version of the 2D pattern or a deformed version of the 3D garment reflecting the deformed first line and the propagated deformation is displayed.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
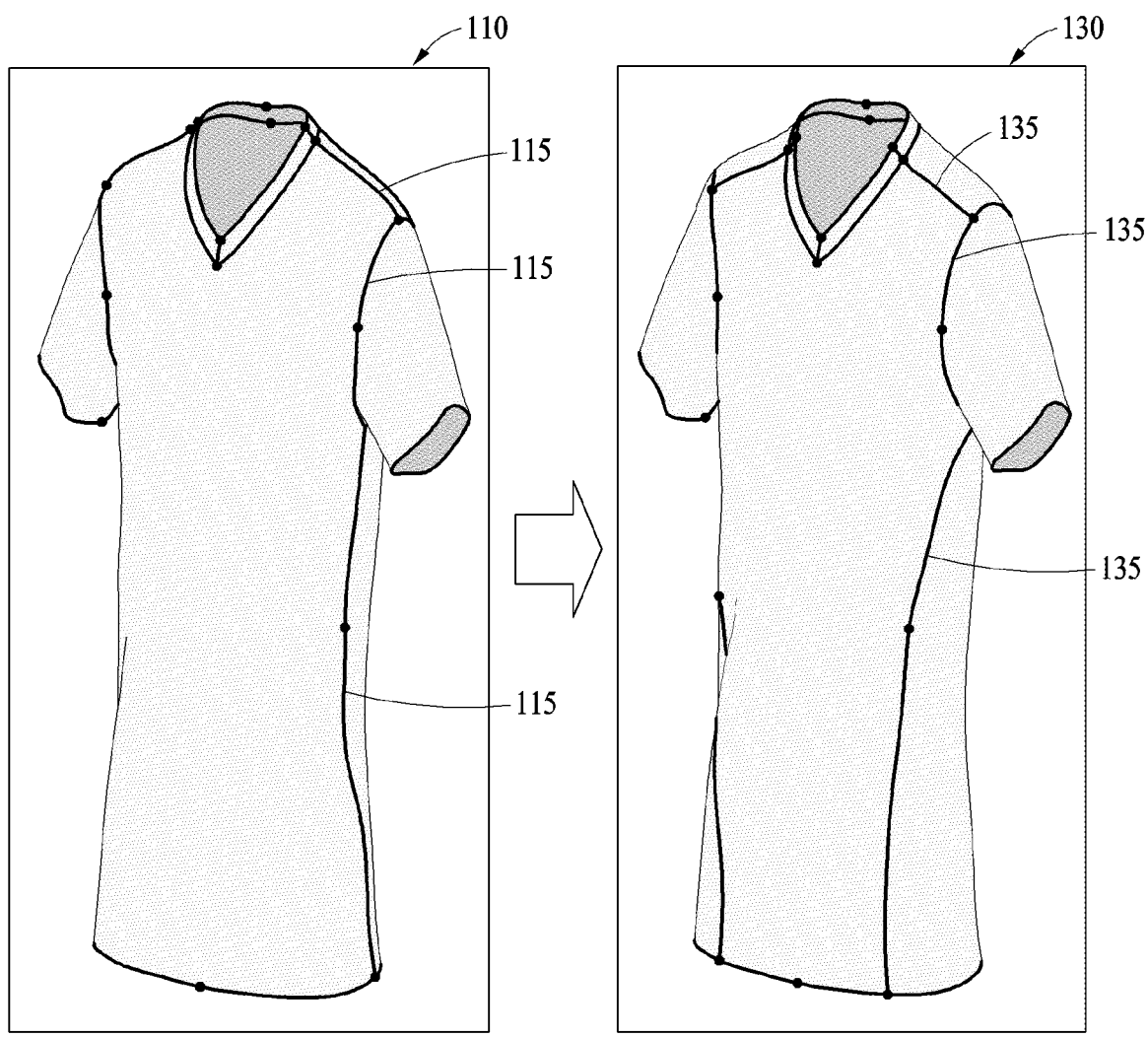
FIG. 1 is a diagram illustrating deforming of a style line of a garment in a three-dimensional (3D) space through a user interface, according to an example embodiment.

Hereinafter, example embodiments will be described in detail with reference to the accompanying drawings. Various modifications may be made to the example embodiments. Here, the example embodiments are not to be construed as being limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

A component having a common function with a component included in one example embodiment is described using a like name in another example embodiment. Unless otherwise described, description made in one example embodiment.

FIG. 1 is a diagram illustrating style lines of a 3D garment that may be manipulated using a user interface, according to an example embodiment. FIG. 1 illustrates 3D garment 110 before deforming a style line 115, and 3D garment 130 after deforming the style line 115 to style line 135 through user interface.

A "style line" described herein refers to a line in a 3D garment that is comprised of one or more segments and manipulated to modify the shape of the 3D garment. A "segment" can be an outline of a garment, a sewing line of 2D patterns of a garment, a boundary line of 2d patterns of a garment, an internal line of 2d patterns of a garment, and a cut line but not limited to the foregoing. The style line may include, among others, an outline of a garment, a sewing line of 2D patterns of a garment, and a cut line. The term "line" or "sewn line" is a counterpart of a style line in a 2D pattern.

In the example of FIG. 1, the style line 115 of the 3D garment 110 is deformed into the style line 135 of the 3D garment 130. By deforming the style line 135 to lower a shoulder line of the style line 115 and moving an armhole line and a position of a side line forward, the 3D garment 130 may be appear slimmer compared to the 3D garment 110. As such, even though the overall outer shape of the garment remains the same, the perceived appearance of the same garment, may appear different by deforming the style line, adding cutting lines or removing cutting lines.

In one or more embodiments, various style changes are embodied without changing a garment size by maintaining the overall 3D shape or 3D volume of the corresponding garment despite deforming of the style line 115 of the 3D garment 110.

When deforming the style line 115 of the 3D garment 110, a garment simulation apparatus may apply deformation of the style line 115 in the 3D garment 110 to 2D patterns so that the deformed style line 135 of the 3D garment 130 is reflected. The effect of the deformation of the style line 115 occurring in the 3D garment 110 in the 2D patterns forming the 3D garment 110 will be described in greater detail with reference to FIG. 2.

Figure 2:
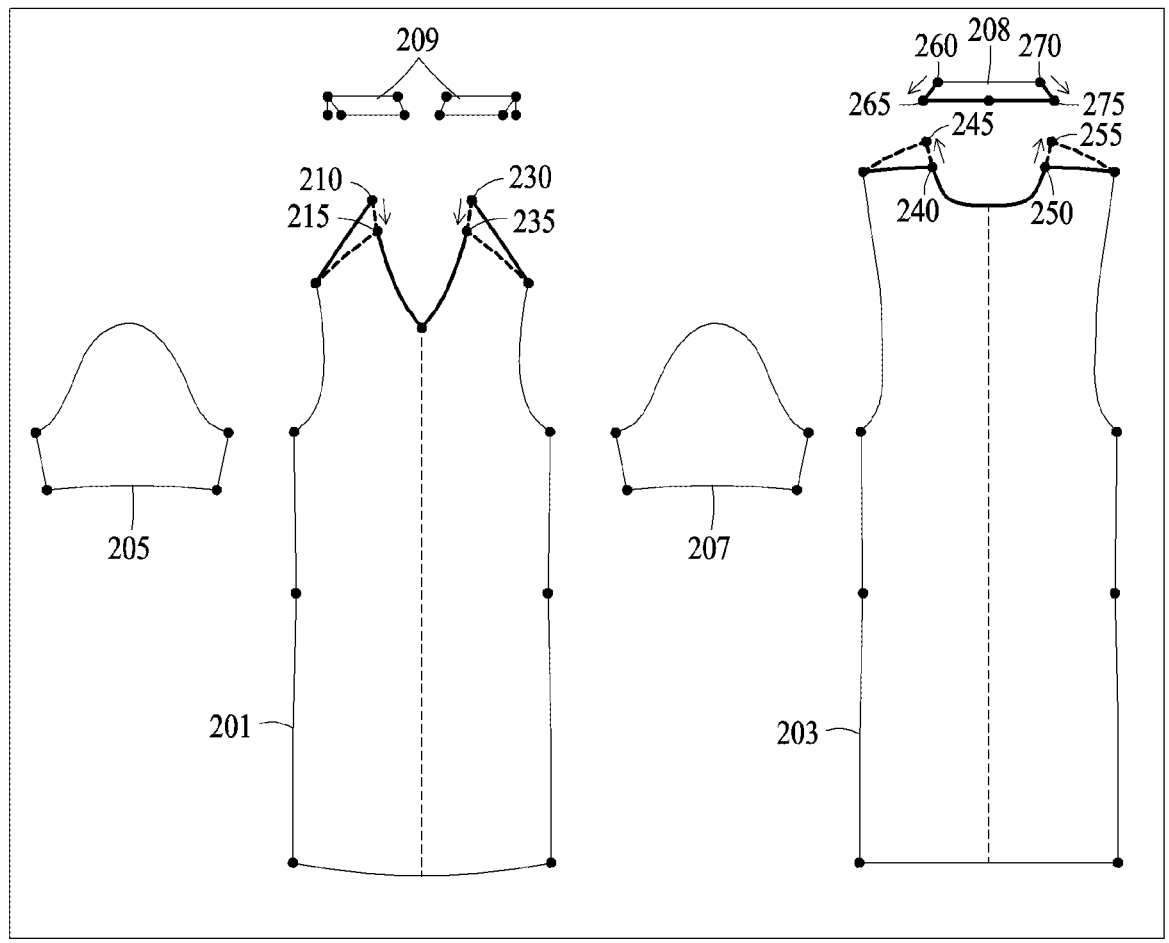
FIG. 2 is a diagram illustrating deformation of a style line in a 3D garment on two-dimensional (2D) patterns, according to an example embodiment.

Although not shown in FIG. 1, the 3D garments 110 and 130 and 2D patterns 201, 203, 205, 207, 208, and 209 of FIG. 2 are formed of a mesh including a plurality of polygons. The mesh may be modeled in various ways. For example, vertices of a polygon may be point masses having mass, and sides of the polygon may be represented as springs having elasticity which connects the point masses. A 3D garment according to an example embodiment may be modeled by a mass-spring model. The springs may have respective resistance values against, for example, stretch, shear, and bending, depending on a material property of fabric used. In addition or alternatively, the mesh may be modeled as a strain model. A polygon included in the mesh may be modeled as, for example, a triangle or a polygon with four or more angles. In some cases, when modeling a 3D volume, the mesh may be modeled as a 3D polyhedron.

Vertices of the polygons included in the mesh may move by an external force such as gravity, and an internal force such as stretch, shear, and bending. When a force being applied to each vertex is obtained by calculating the external force and the internal force, a speed of a motion and displacement of each vertex may be obtained. A motion of a garment may be simulated through motions of the vertices of the polygons included in the mesh in each time motion. For example, by draping a garment formed with a polygonal mesh over a 3D avatar, it is possible to embody a 3D virtual garment that looks natural based on the laws of physics. The vertices of the polygons included in the mesh may move according to the action of the external force such as gravity, and the action of the internal force such as stretch, shear, and bending. When a force being applied to each vertex is obtained by calculating the external force and the internal force, a speed of a motion and displacement of each vertex may be obtained. A motion of a virtual garment may be simulated through motions of the vertices of the polygon included in the mesh in each time step. By draping a 2D pattern formed with a polygonal mesh over a 3D avatar, it is possible to embody a 3D virtual garment that appears natural based on the laws of physics.

According to an example embodiment, the 3D garments 110 and 130 may include at least one of, for example, a virtual garment fitting a body size of a user, a virtual garment for a 3D virtual character, and a virtual garment for a 3D virtual avatar.

FIG. 2 is a diagram illustrating modifying a style line in a 3D garment on 2D patterns reflected in 2D patterns, according to an example embodiment. FIG. 2 illustrates 2D patterns 201, 203, 205, 207, 208, and 209 that make up a 3D garment (e.g., "short-sleeved top") according to an example embodiment.

The 2D patterns 201, 203, 205, 207, 208, and 209 may correspond to parts of a 3D virtual garment. The 2D patterns 201, 203, 205, 207, 208, and 209 may be virtual 2D patterns modeled with a set of a plurality of polygons for simulation of the 3D virtual garment. The 2D patterns 201, 203, 205, 207, 208, and 209 may include a plurality of pattern pieces. Each of the plurality of pattern pieces may be modeled with a polygonal mesh based on a body shape of a 3D avatar. The polygonal mesh may include a plurality of polygons (for example, a triangle or quadrangle).

In FIG. 2, the 2D pattern 201 may correspond to a front piece of an upper garment and the 2D pattern 203 may correspond to a back piece of the upper garment. The 2D patterns 205 and 207 may correspond to sleeves and the 2D patterns 208 and 209 may correspond to neck collars.

A user may change a position of a right shoulder line of the 3D garment by selecting a point corresponding to a right neck of the 2D pattern 201 corresponding to the front side of the upper garment and moving the point from a first position 210 to a second position 215. In this example, to apply the positional change of the right shoulder line equally to a left shoulder line, 2D patterns of the corresponding garment may be deformed as follows.

First, when changing a position of the right shoulder line of the 3D garment, a position of the left shoulder line which corresponds to the position of the right shoulder line in the 2D pattern 201 corresponding to the front side of the upper garment may be changed from a first position 230 to a second position 235. In accordance with changes of left and right neck portions of the 2D pattern 201, positions of both neck portions of the 2D pattern 209 which is a collar sewn onto the 2D pattern 201 may also be changed.

In an example embodiment, to ensure that a 3D shape of the 3D garment is substantially maintained even if a style line of the 3D garment is changed, a positional change of the shoulder line may be applied to the back side of the upper garment, which is combined with the front side of the upper garment. In other words, when the position of the shoulder line in the front side of the upper garment moves forward, the position of the shoulder line in the back side of the upper garment connected to the front side of the upper garment by sewing, may move forward accordingly. For this purpose, positions of both shoulder lines of the 2D pattern 203 corresponding to the back side of the upper garment may be changed from first positions 240, 250 to second positions 245, 255. In conjunction, positions of the 2D pattern 208 sewn on the left and right portions of the 2D pattern 203 may be changed from, for example, first positions 260, 270 to second positions 265, 275.

In addition, when the user moves a position of one point on a center line in the 2D pattern 201 in a downward direction, a position of a portion connected with a center line in the 2D pattern 209 corresponding to a neck collar to be combined with the 2D pattern 201 and an area of the 2D pattern 209 may be deformed by a distance that the position of the point is moved.

When the user moves one point on a style line in three dimensions, or when the user changes a curvature of a line, a garment simulation apparatus may simultaneously deform a point or a line on another 2D pattern sewn on a 2D pattern including the corresponding point or the corresponding line such that a change in a style line of a 3D garment is naturally applied to 2D patterns. In addition, the garment simulation apparatus may conserve a total sum of areas of 2D patterns before deformation of a style line to be the same after the deformation so that a 3D shape of the garment is maintained as much as possible.

As described above, when the user moves the style line of the 3D garment or one point on the style line, the garment simulation apparatus may change positions or curvatures of lines associated with 2D lines (for example, the first line) corresponding to a style line selected by the user from each of the 2D patterns constituting the 3D garment so that a style line deformation of the 3D garment is also applied to the 2D patterns.

Lines associated with a first line refers to all lines that are changed by deformation of the first line. The lines associated with the first line may include, but are not limited to, a second line corresponding to the first line in a second pattern that is symmetrical to a first pattern including the first line or copied from the first pattern, and a sewn line of at least one third pattern connected to at least one of the first line and the second line by sewing. The first pattern, the second pattern, and the third pattern may correspond to 2D patterns.

Figure 3:
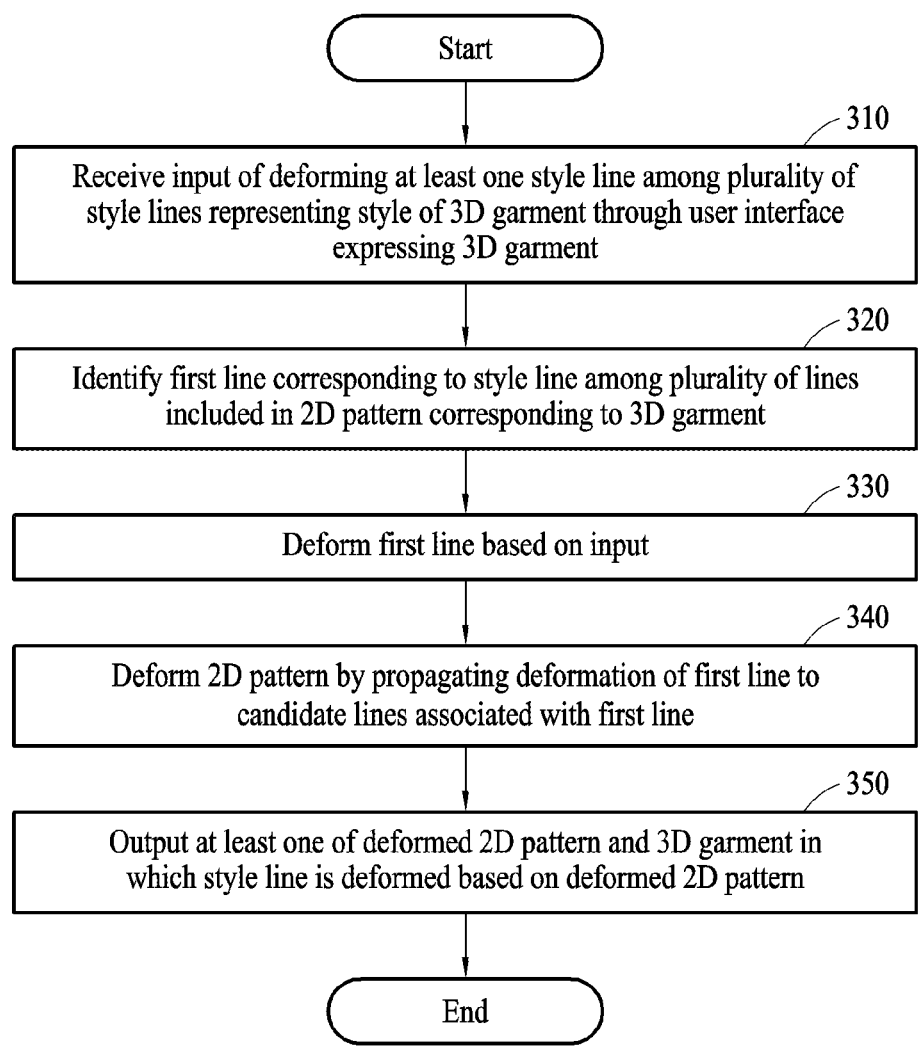
FIG. 3 is a flowchart illustrating a garment simulation method, according to an example embodiment.

A method of searching for and changing lines associated with a line corresponding to a style line will be described in greater detail with reference to FIGS. 3 through 15. FIG. 3 is a flowchart illustrating a garment simulation method, according to an example embodiment. FIG. 3 illustrates a process of displaying, by a garment simulation apparatus, a 3D garment in which a style line is deformed. The process may be, but not necessarily be, performed in the sequence of FIG. 3. For example, the order of operations may be changed, and at least two operations may be performed in parallel.

The garment simulation apparatus may receive 310 an input of deforming at least one style line among a plurality of style lines defining the shape of a 3D garment through a user interface displaying the 3D garment. The input of deforming the style line may be provided by a user selecting a point on the style line and moving a position of the selected point in a direction. Since the input of deforming the style line is provided by moving a point on a line (hereinafter referred to as a "current deform line (CDL)"), the input (point) of deforming the style line may also be referred to hereinafter as a "current deform point (CDP)." Hereinafter, the terms "input of deforming the style line" and the "CDP" are used interchangeably.

The garment simulation apparatus may identify 320 a first line corresponding to the style line deformed based on received input. The first line may correspond to a 2D line on the 2D pattern corresponding to a position of the style line of the 3D garment deformed by the input of the user.

The garment simulation apparatus may deform 330 the first line based on the received user input. The garment simulation apparatus may deform the 2D pattern(s) constituting the 3D garment such that a shape, a volume or both of the 3D garment are substantially maintained. The shape of the 3D garment may be maintained, for example, by changing a length of a line sewn on the first line in the 2D pattern or an area of at least one 2D pattern including the sewn line. Since the deformed first line is a line currently deformed by the input of deforming the style line in the 3D garment, the "deformed first line" may also be referred to as a current deform line (CDL). Hereinafter, the terms "deformed first line" and the "CDL" are used interchangeably. A method of deforming, by the garment simulation apparatus, the first line based on the deformed style line will be described in greater detail with reference to FIGS. 6A through 7.

The garment simulation apparatus may deform 340 the 2D pattern by propagating deformation of the first line to candidate lines associated with the first line. The "candidate lines" associated with the first line may include at least one of a second line that is symmetrical to a first pattern including the first line or a copy of the first line in a pattern different from a pattern where the first pattern is included, and a sewn line of a pattern connected to at least one of the first line and the second line by sewing. The second line corresponding to the first line of a first pattern may be located in a second pattern at a position symmetrical to the same position as the first line in the first pattern.

The garment simulation apparatus may generate a deforming line list (DLL) including the deformed first line and the candidate lines to which the deformation of the first line is propagated. The DLL may store information on the candidate lines, for example, in the form of a queue with a first-in-first-out (FIFO) structure.

The DLL may be generated based on whether at least one of a length, a shape, and a curvature of the first line is changed by the input. When at least one of the length, the shape, and the curvature of the first line is changed by the input, the garment simulation apparatus may include the deformed first line in the DLL.

The garment simulation apparatus may deform the candidate lines by propagating the deformation in the first line. The garment simulation apparatus may deform the candidate lines by propagating the deformation of the first line based on a deformation propagation algorithm as shown in Table 1 below. For example, the garment simulation apparatus may deform a target line based on the deformation by the input of the user, and then add the deformed target line to the DLL. The target line may include a line to be deformed by the input of the user. The garment simulation apparatus may apply the deformation by the input of the user to a line having a symmetrical relationship or an instance relationship with the target line and add the line of symmetrical relationship to the DLL. An "instance" of a predetermined line or pattern may indicate another line or another pattern copied from the corresponding line or pattern.

For each of the lines included in the DLL, the garment simulation apparatus may perform: i) an operation of removing the corresponding line from the DLL while acquiring the corresponding line; ii) an operation of reflecting deformation of a line corresponding to a sewn line not yet deformed among lines connected to the corresponding line by sewing and adding the line to the DLL; and iii) an operation of applying a deformation of the corresponding line to a line having a symmetrical relationship or an instance relationship with a sewn line and adding the line to the DLL. The garment simulation apparatus may repetitively perform the above operations until no line remains in the DLL.

TABLE 1

1) Add two lines (or one line of which curvature is changing) of picking point to deforming line list (DLL)

TABLE 1-continued a) If there is line corresponding to symmetry or instance, set it with the same deformation and add it to DLL
b) Mark "visit"
2) Repeat the following until DLL is empty
   a) Visit each line (current deform line, CDL) in DLL and find another line (sewn line, SL) connected to corresponding line by sewing (here, skip visit-marked line)
      i) Remove CDL from DLL
   b) Apply deformation corresponding to CDL for each SL, and then mark "visit" on SL
      i) Equally deform line corresponding to symmetry or instance in SL
   c) Add deformed SLs in DLL For example, when the user input of deforming the style line corresponds to a position of a vertex of a first pattern of at least one of the 2D patterns, the garment simulation apparatus may add two deformed first lines contacting the corresponding input to the DLL. Also, when the input corresponds to one point on the first line instead of the vertex of the first pattern, the garment simulation apparatus may add the deformed first line to the DLL.

The garment simulation apparatus may search for candidate lines deformed in association with the deformed first line. The garment simulation apparatus may search for, for example, a second line that is symmetrical to the first line in a first pattern or that is a copied version of the first line of the first pattern in a second pattern. The garment simulation apparatus may search for, for example, at least one sewn line connected by sewing to each of the lines (e.g., the first line, the second line, etc.) stored in the DLL. In addition, the garment simulation apparatus may input the sewn line connected to the first line and/or the second line by sewing to the DLL. The garment simulation apparatus may deform the candidate line found by the searching and then, store information on the deformed candidate line in the DLL.

The garment simulation apparatus may deform the 2D pattern based on the DLL. For example, the candidate lines connected to the sewn line may be deformed, and the garment simulation apparatus may remove the deformed candidate lines from the DLL. The garment simulation apparatus may change a length of the sewn line or an area of at least one pattern including the sewn line by reflecting the deformation of the candidate lines connected with the sewn line.

The garment simulation apparatus may reflect a change of at least one sewn line (hereinafter referred to as "SL") connected by sewing to each of the lines stored in the DLL and change a line that is symmetrical to a third pattern including the changed sewn line or corresponds to the sewn line in a fourth pattern copied from the third pattern.

The garment simulation apparatus may change a position of a point at a position corresponding to an input (CDP) on another 2D pattern corresponding to a 2D pattern in which an input (CDP) of deforming the style line is generated on a CDL or a position of a sewn point on the other 2D pattern sewn on the 2D pattern.

For example, when a length of the first line (CDL) is changed by the input (CDP), the garment simulation apparatus may change a position of a seam point on entire lines changed in length such that a distance between the seam point and a stationary end point of the lines (e.g., an end point opposite a moving end point) is substantially maintained. In other words, the garment simulation apparatus may change positions of seam points such that distances between seam points on the sewn line and an end point opposite a point (CDP) deformed on the first line (CDL) of the first pattern are substantially maintained.

The garment simulation apparatus may change a position of the seam point such that a ratio of the sewn line is substantially maintained. The "seam point" refers to a point on a sewn line on which the corresponding pattern is sewn onto another pattern. The "seam point" is also referred to as a "seamline point" and may be abbreviated as an "SLP." Hereinafter, the terms "seam point" and the "SLP" are used interchangeably.

When the length of the first line of the 2D pattern is reduced by the input of deforming the style line, the input (CDP) of deforming the style line may be moved only up to a closest seam point. In this example, the garment simulation apparatus may connect the input (CDP) of deforming the style line and a seam point located closest to the corresponding input (CDP). Also, when an SLP on an SL of the third pattern connected to the candidate lines by sewing is moved in response to the first line being deformed by the input (CDP), the garment simulation apparatus may move the SLP of the third pattern up to a position of a straight-line point or a seam point adjacent to the corresponding seam point. When an area of the 2D pattern including the first line is changed by the input, the garment simulation apparatus may move the position of the seam point by calculating the position such that a distance ratio is substantially maintained. In other words, when the area of the 2D pattern is changed by the use input, the garment simulation apparatus may determine the position of the seam point on the line corresponding to the area change such that a distance ratio (for example, distance from one end point of the line to the seam point/line length) is substantially maintained. A method of deforming the 2D pattern by the garment simulation apparatus will be described in greater detail with reference to FIGS. 8 through 15.

The garment simulation apparatus outputs 350 at least one of the deformed 2D pattern and the deformed 3D garment. The garment simulation apparatus may display the deformed 2D pattern on a screen, or output the deformed 2D pattern in a form of data to an outside of the garment simulation apparatus. Also, the garment simulation apparatus may display the 3D garment in which the style line is deformed, on a user interface through a simulation based on the 2D pattern deformed in operation 340.

Figure 4:
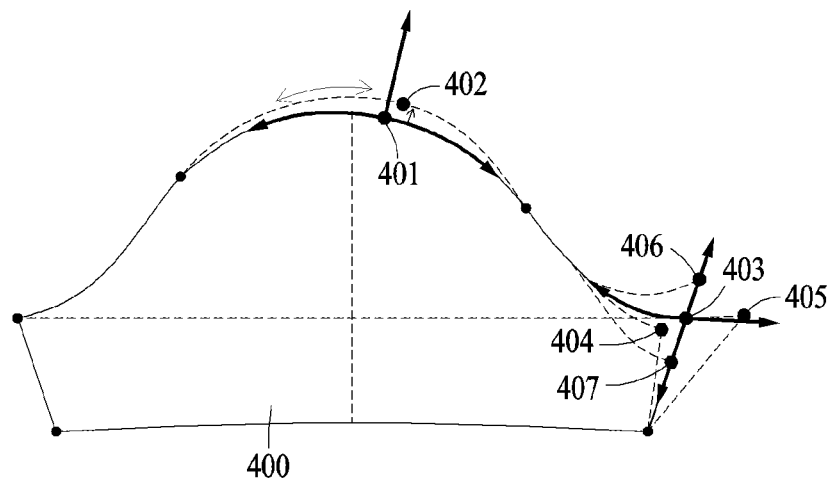
FIG. 4 is a diagram illustrating restrictions imposed on deforming of a style line in a 3D garment as reflected on a 2D pattern, according to an example embodiment.

FIG. 4 is a diagram illustrating restrictions applied when an input of deforming a style line in a 3D garment is reflected onto a 2D pattern, according to an example embodiment. FIG. 4 illustrates a 2D pattern 400 corresponding to a sleeve of a 3D garment according to an example embodiment.

In an actual garment simulation, a style line of a 3D garment may be directly deformed by a user input moving a point or line segment on the style line of the 3D garment displayed through a user interface. For ease and convenience, a style line deformation of a 3D garment will be described based on a movement or deformation of lines of a 2D pattern.

A user may click a point 401 on an outline of the 2D pattern 400 corresponding to a sleeve line of a 3D garment or a point 403 on an edge of a sleeve pattern, and then move the clicked point to left and right or upper or lower positions 402, 404, 405, 406, and 407. If a user without professional knowledge about garments edits a garment by changing the style line, the user may ignore even a basic restrictions on the shape of the 2D pattern for designing a garment. This may result in breaking of the 2D patterns and render the simulation of a garment impossible. Hence, a user input for deforming a style line may be limited to a length change or an area change of a line segment. Through such limitation, even if the user moves a point or a line segment on the 3D garment, the simulation of the 3D garment may be performed without breaking the 2D pattern. For example, the garment simulation apparatus may restrict the movement of a point 401 selected by the input such that the style line is moved horizontally along an outline of the 2D pattern 400 or deformed to the position corresponding to a direction orthogonal to the outline of the 2D pattern 400. Also, the garment simulation apparatus may move the point 403 selected by the user to the positions 402, 404, 405, 406, and 407 in a vertical direction orthogonal to the outline or in a horizontal direction along the outline of the 2D pattern corresponding to the sleeve line such that a size of a sleeve or sleeve cap implemented with the 2D pattern 400 is changed. In this example, a moving distance of the input (for example, the points 401 and 403) of deforming the style line may be restricted to a predetermined distance (for example, a maximum deformable distance of the corresponding pattern).

When the point 403 selected by the user is moved to the position 404 or 405 corresponding to the horizontal direction along the outline of the 2D pattern corresponding to the sleeve line, the garment simulation apparatus may change the length of the sleeve line. In addition, when the points 401, 403 selected by the user are moved to the positions 402, 406, and 407 corresponding to the vertical direction orthogonal to the outline, the garment simulation apparatus may change a size of a sleeve area of the 3D garment.

Figure 5:
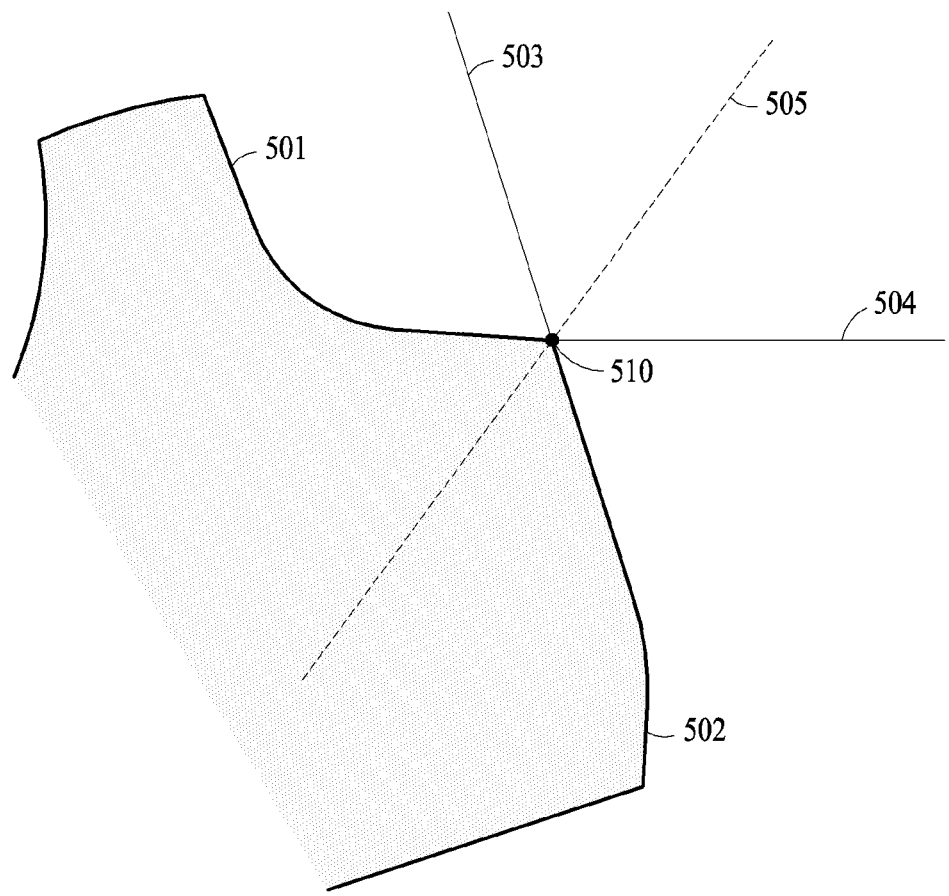
FIG. 5 is a diagram illustrating a deformation scheme in which deformation of a style line occurring in a 3D garment is reflected on a 2D pattern of the garment, according to an example embodiment.

FIG. 5 is a diagram illustrating a deformation scheme in which deformation of a style line occurring in a 3D garment is reflected on a 2D pattern of a garment, according to an example embodiment. Referring to FIG. 5, a user according to an example embodiment may select one point on a 3D garment.

Between both lines 501 and 502 connected via a point 510 of a 2D pattern, two tangent lines 503, 504 connected to both lines 501, 502, and a normal line 505 across both lines 501, 502 in the center, the garment simulation apparatus may search for a line closest to a change direction of the point 510. As will be described in detail below, the change direction of point 510 may be determined based on a style change input of a user or determined in response to a change in an associated line to which the change is being propagated.

When the searched line is close to one of lines 501 and 502 connected to the point 510, the garment simulation apparatus may apply a length change to the corresponding line (for example, the line 501). In addition, the garment simulation apparatus may apply an area change to a line (for example, the line 502) connected to the corresponding line.

Alternatively, when the searched line is close to one of the two tangent lines 503, 504, the garment simulation apparatus may apply a length change to a line (for example, the line 502) of the corresponding tangent line (for example, the tangent line 503). In addition, the garment simulation apparatus may apply an area change to a line (for example, the line 501) connected to the corresponding line.

When the searched line is close to the normal line 505, the garment simulation apparatus may apply an area change to both lines 501, 502. In this case, when a curvature of the point 510 is changed by a user input to be greater than a predetermined angle, the garment simulation apparatus may not allow any more area change.

In the following descriptions, when the direction change of the point 510 is within a predetermined angle with respect to a direction of a line, this may be referred to as "the change direction is parallel to the line" and a length change may be applied to the corresponding line. In addition, when an angle of the change direction of the point 510 with respect to the direction of the line excesses the predetermined angle, this may be referred to as "the change direction is not parallel to the line" and an area change may be applied to the corresponding line.

The length change may refer to an operation of increasing or decreasing a length while the direction of a line is maintained. The area change may refer to an operation of changing a line such that a sum of areas of associated pattern is substantially maintained.

Figure 6A:
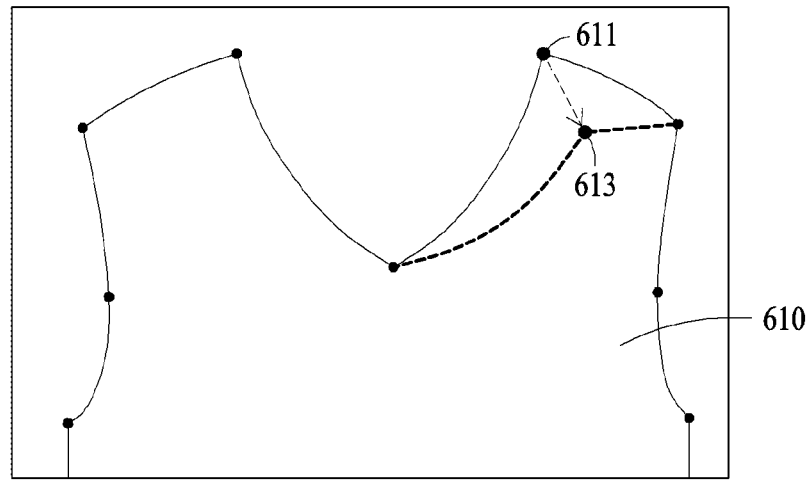
FIGS. 6A and 6B are diagrams illustrating deforming of a style line moved within or outside a 2D pattern, according to an example embodiment.
Figure 6B:
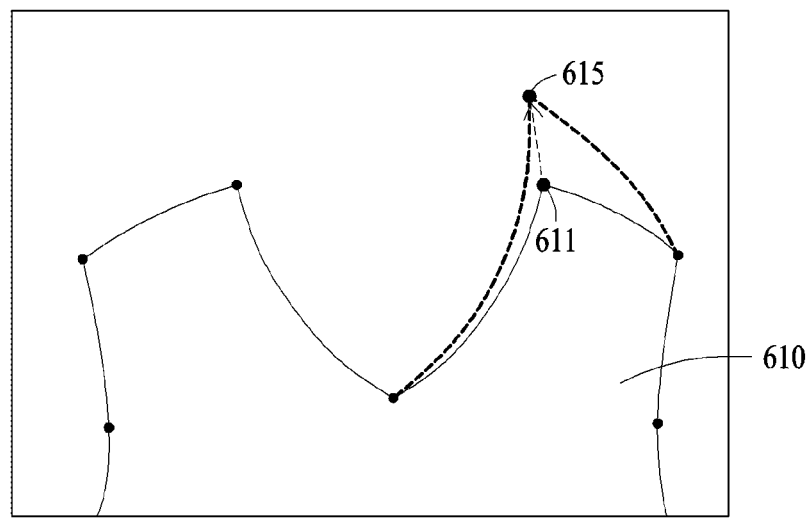

FIGS. 6A and 6B are diagrams illustrating deforming of a style line by moving a point inside or outside one of 2D patterns, according to an example embodiment. FIG. 6A illustrates a point selected by an input is moved inside a corresponding 2D pattern 610 to deform a style line of a 3D garment. As illustrated FIG. 6A, a point in a 3D garment selected by the input is displayed through a user interface as being moved from a first position 611 on an outline of the 2D pattern 610 to a second position 613 inside the 2D pattern 610. The garment simulation apparatus may calculate 2D coordinates corresponding to the second position 613 to which the input is moved. The garment simulation apparatus may calculate a 2D positional variation (dv) of the input based on the 2D coordinates. The 2D positional variation may correspond to an amount of positional change in a corresponding 2D pattern changing in response to a style line change of the 3D garment. The garment simulation apparatus may move a position of a line of a 2D pattern corresponding to a style line of the 3D garment based on the 2D positional variation.

A user may click one point or one line on the 3D garment using a mouse pointer and then move the clicked point or line to a position corresponding to an inside of the 3D garment, that is, a position corresponding to an inside of a 2D pattern constituting the 3D garment by dragging a mouse pointer. The garment simulation apparatus may calculate 2D coordinates corresponding to a 3D point at which the moved mouse pointer is located, thereby calculating a 2D positional variation corresponding to the position of the moved input.

For example, the garment simulation apparatus may calculate the 2D positional variation by subtracting the 2D coordinates ("initial position") of the 2D pattern (corresponding to the point or line initially clicked by the mouse pointer) from 2D coordinates of a 2D pattern corresponding to one point or line segment on a style line in which the mouse pointer is located in a 3D space currently displayed on a screen. In this example, the point at which the mouse pointer is currently located may correspond to a position to which the initial position of the mouse pointer is changed. The changed position of the mouse pointer may be, for example, calculated by calculating a triangle of a mesh included in the 2D pattern corresponding to the point at which the mouse pointer is located and barycentric coordinates of the corresponding triangle and using the triangle of the mesh and the barycentric coordinates of the corresponding triangle. Specifically, the garment simulation apparatus may check a ray-triangle intersection for triangles of all meshes using an index of the triangle of the mesh in three dimensions where the mouse pointer is located. The garment simulation apparatus may find a triangle closest to a camera among triangles where the intersection occurs and also obtain barycentric coordinates of a point that intersects with the corresponding triangle. Since an index of a 3D triangle is the same as an index of a 2D triangle, positions x0, x1, and x2 of three vertices of the 2D triangle can be obtained. Accordingly, when a, b, and c are given as the barycentric coordinates, the garment simulation apparatus may calculate a changed 2D position through, for example, a*x0+b*x1+c*x2.

The garment simulation apparatus may deform a line of a 2D pattern corresponding to a deformed style line by moving a position of a point or line of the 2D pattern based on a 2D positional variation.

FIG. 6B illustrates deforming of a style line of a 3D garment by moving a selected point outside the 2D pattern 610, according to one embodiment. As illustrated FIG. 6B, a point selected by the input is moved from an outside of the 3D garment, that is, the first position 611 on the outline of the 2D pattern 610 to a third position 615 outside the 2D pattern. In this case, the garment simulation apparatus may calculate a 3D positional movement value (3D dv) of the moved input. For example, the garment simulation apparatus may calculate the 3D positional movement value by subtracting a 3D position of a point or line initially clicked by a mouse pointer from a 3D position of a point or line currently indicated by the mouse pointer in a 3D space in which the 3D garment is represented.

The garment simulation apparatus may calculate a transformation matrix (T) of a polygon of a mesh including the input based on the 3D positional movement value. The transformation matrix may be a matrix that converts three dimensions into two dimensions. The garment simulation apparatus may calculate a 2D positional variation corresponding to the input in three dimensions based on the transformation matrix.

The garment simulation apparatus may calculate a 2D positional variation (2D dv) based on, for example, the transformation matrix (T)×the 3D positional movement value (3D dv). The garment simulation apparatus may apply deformation of a style line to the 2D pattern by moving the position of the line of the 2D pattern based on the 2D positional variation.

Figure 7:
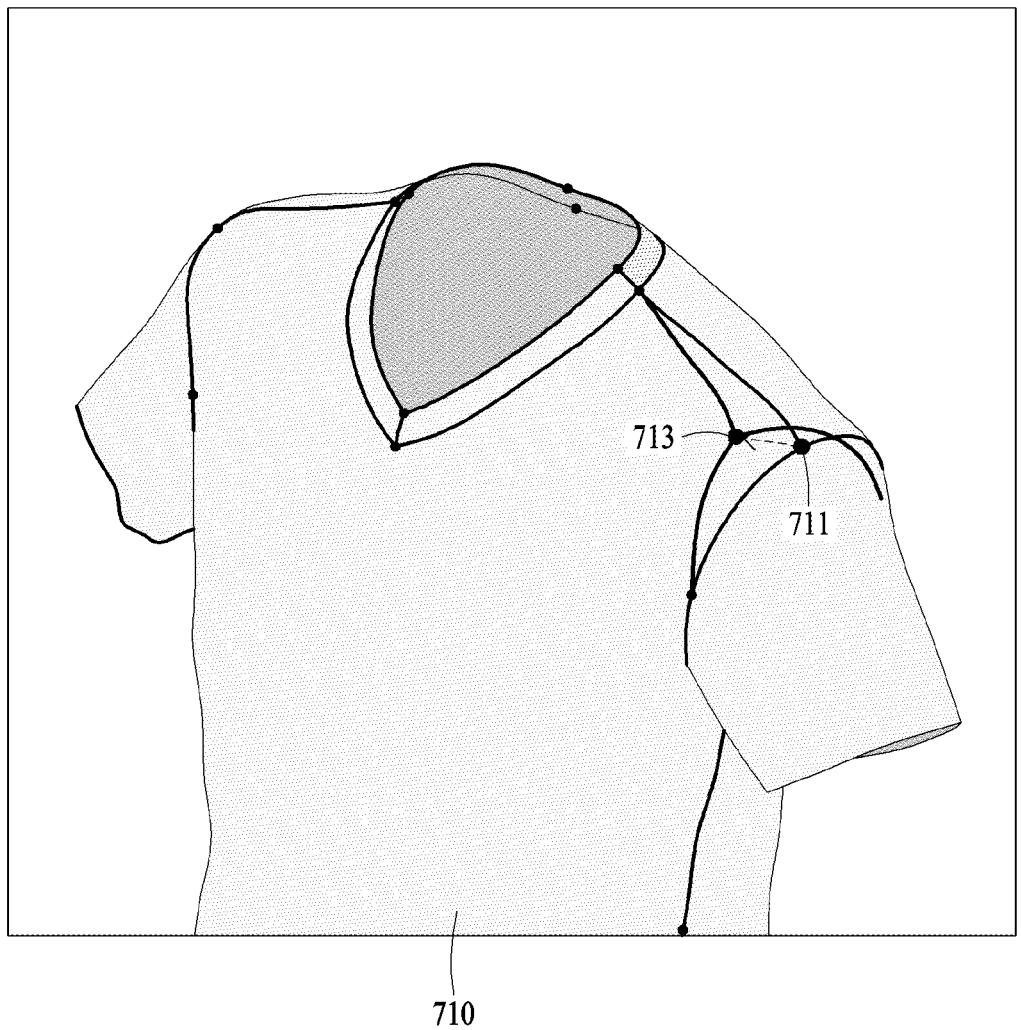
FIG. 7 is a diagram illustrating deforming of a style line moving across a plurality of 2D patterns, according to an example embodiment.

FIG. 7 is a diagram illustrating a case in which an input of deforming a style line moves throughout a plurality of 2D patterns, according to an example embodiment. FIG. 7 illustrates a situation in which lines of three patterns corresponding to a front side, a back side of an upper garment, and a sleeve are moved by changing one point of a style line of a 3D garment 710 from a first position 711 to a second position 713.

For example, assume that an input for deforming a style line is moved from a 2D pattern corresponding to an initial mouse-clicked position across several 2D patterns, to a position of a 2D pattern not connected by sewing with the 2D pattern that was initially clicked by a mouse, or moved to a background area other than the 3D garment 710 (or a 2D pattern corresponding to the 3D garment). In such case, the garment simulation apparatus may process in the same way as when a position of the input of deforming the style line of the 3D garment 710 is moved within any one of 2D patterns.

In contrast, a point or line segment selected by a user by clicking a mouse on the 3D garment 710 may be moved to another 2D pattern connected by sewing to the 2D pattern initially clicked by the mouse. In such case, the garment simulation apparatus may change the position of the input of deforming the style line of the 3D garment to a position on the other 2D pattern connected by sewing to the 2D pattern initially clicked by the mouse.

For example, when a first line or a first vertex of a first pattern is selected by a user through a user interface (e.g., a mouse), the user may move a position of the pointer to a third pattern connected to the first pattern by sewing. In this example, the garment simulation apparatus may change a position of the first line selected by the mouse from the third pattern to a position of a third line corresponding to the first line, or change a position of the first vertex selected by the mouse from the third pattern to a position of a third vertex corresponding to the first vertex.

As described with reference to FIG. 6A, the garment simulation apparatus may calculate 2D coordinates corresponding to a position of the moved input and deform a line of a 2D pattern corresponding to the deformed style line by moving a position of a point or line by a 2D positional variation calculated based on the 2D coordinates.

Figure 8:
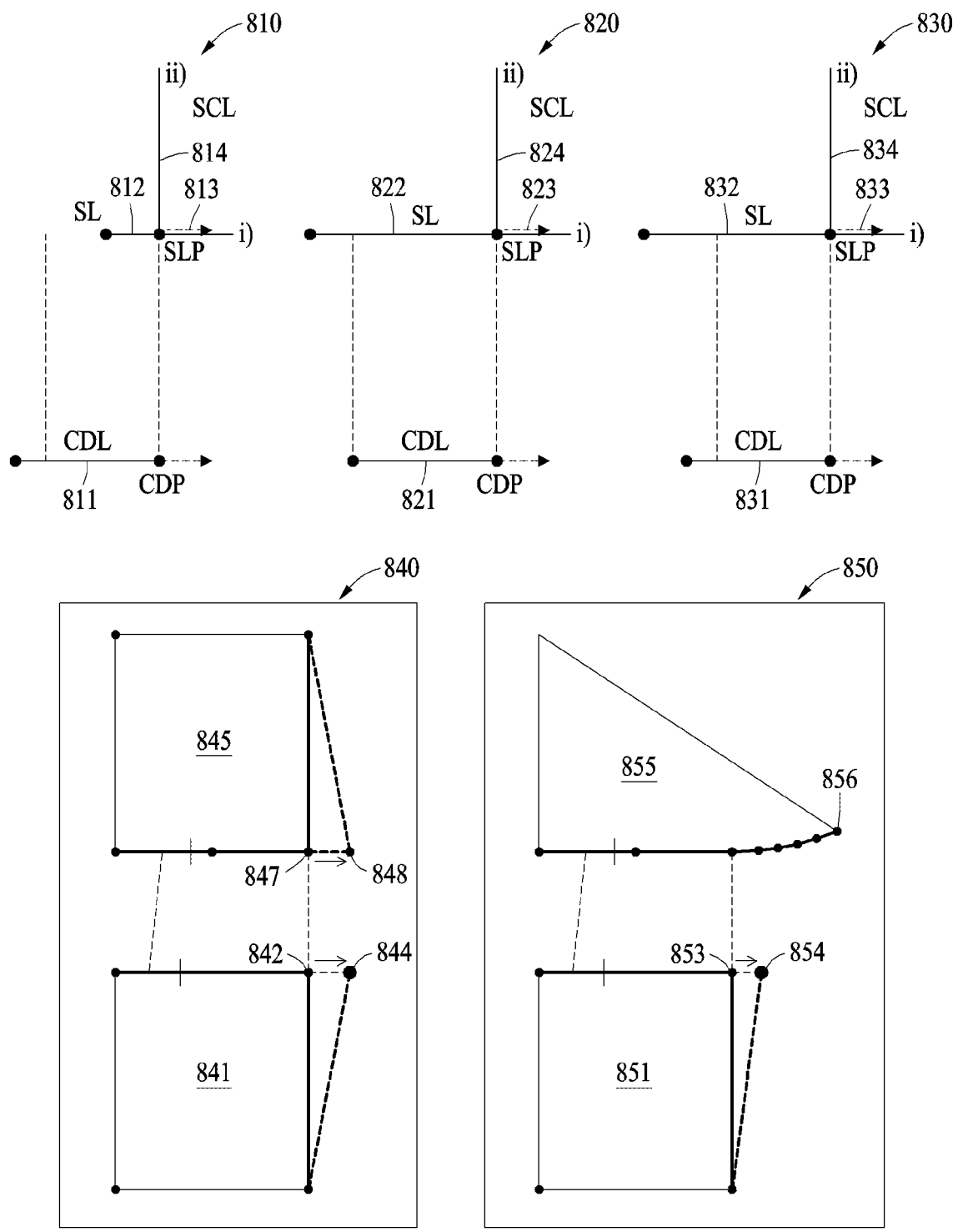
FIGS. 8 through 12 are diagrams illustrating a method of determining a length change in lines associated with a line corresponding to a style line, according to example embodiments.

FIGS. 8 through 12 are diagrams illustrating a method of reflecting a length change occurring in lines associated with a line corresponding to a style line due to an input of deforming the style line, according to example embodiments. Referring to FIG. 8, in examples 810, 820, and 830, CDPs moving on the CDLs 811, 821, and 831 are connected to ends of SLs 812, 822, and 832 and sewn on SLPs on the SLs 812, 822, and 832.

When a point (CDP)) selected by the input is connected to an end of one or more SLs 812, 822, and 832 connected by sewing to the CDLs 811, 821, and 831, and when the CDP is sewn onto SLPs at the ends of the SLs 812, 822, and 832, the garment simulation apparatus may change a length of at least one of one or more seamline connected lines (SCLs) 813, 814, 823, 824, 833, and 834 connected to the SLs 812, 822, and 832 and the SLs 812, 822, and 832 in response to lengths of the CDLs 811, 821, and 831 being changed by moving the CDP.

The garment simulation apparatus may determine a line to be changed in its length based on whether the SLs 812, 822, and 832 are parallel with the one or more SCLs 813, 814, 823, 824, 833, and 834 connected to the SLs 812, 822, and 832.

For example, like a direction i) of the examples 810, 820, and 830, when the SLs 812, 822, and 832 and the SCLs 813, 823, and 833 connected to the SLs 812, 822, and 832 are parallel with a moving direction (for example, a "horizontal direction") of the point (CDP) on the CDLs 811, 821, and 831, the garment simulation apparatus may change lengths of the SLs 812, 822, and 832 and lengths of the connected SCLs 813, 823, and 833 to prevent the SCLs 813, 823, and 833 connected parallel with the SLs 812, 822, and 832 of the 2D pattern from collapsing.

In contrast, like a direction ii) of the examples 810, 820, and 830, when the SLs 812, 822, and 832 and SCLs 814, 824, and 834 connected to the SLs 812, 822, and 832 are not parallel (for example, vertical) to the moving direction (for example, the "horizontal direction") of the point (CDP) on the CDLs 811, 821, and 831, the garment simulation apparatus may change only the lengths of the SLs 812, 822, and 832.

For example, a user may select a point 842 located at an end of a line of a 2D pattern 841 shown in a box 840 and horizontally move a position of the point 842 to a second position 844. In this example, a point 847 located at an end of a sewn line of a 2D pattern 845 connected to the 2D pattern 841 by sewing may be moved to a position 848, and a moved position of the point 847 may be parallel with the position to which the point 842 is moved. In this example, based on an amount of change (for example, increment) in length of the line of the 2D pattern 841 due to the movement of the point 842, the garment simulation apparatus may change lengths of a sewn line of the 2D pattern 845 sewn together with the 2D pattern 841 and a line connected to the sewn line.

In addition, the user may select a point 853 at an end of a sewn line of a 2D pattern 851 shown in a box 850 and horizontally move a position of the point 853 to a second position 854. In this instance, a position of a point 856 at an end of a sewn line of a 2D pattern 855 connected to the 2D pattern 851 by sewing may not be parallel to the position to which the point 853 is moved. In this case, the garment simulation apparatus may change a length of a sewn line of the 2D pattern 855 sewn together with the 2D pattern 851 in response to the movement of the point 853 and may not change a length of a line connected to the sewn line.

Figure 9:
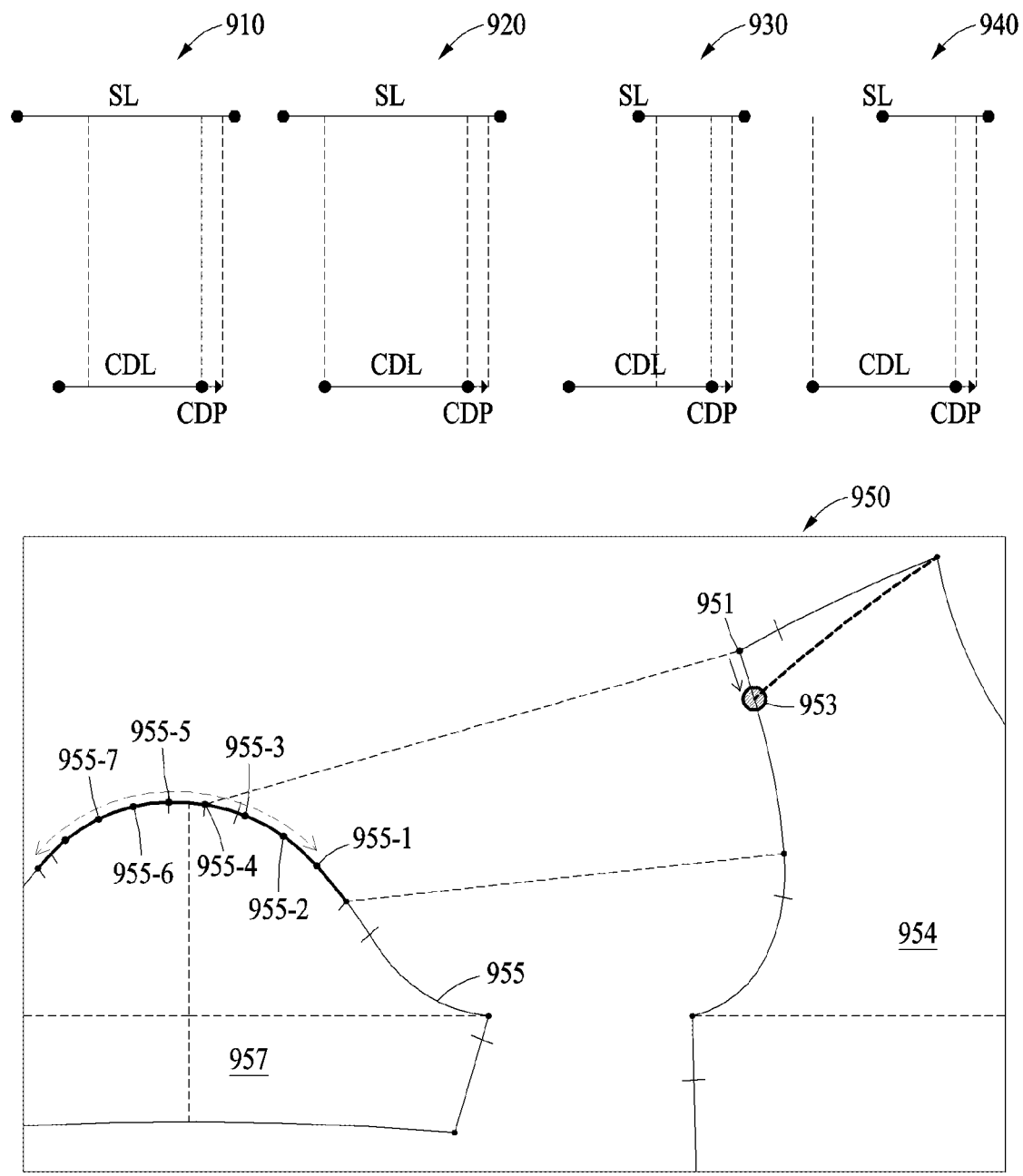

Referring to FIG. 9, as indicated by reference numerals 910, 920, 930, and 940, a CDP moving on a CDL is connected to an end of an SL and sewn in the middle of the corresponding SL, according to an example embodiment. For example, as indicated by the reference numerals 910, 920, 930, and 940, the CDP may be sewn on one point between both ends of an SL of another 2D pattern sewn together. In this case, the garment simulation apparatus may move a seam point at an end of the SL along the SL in response to a length of a CDL being changed by the CDP. However, the garment simulation apparatus may move the seam point not to deviate from the SL.

When the seam point meets another point on the 2D pattern during the movement, the garment simulation apparatus may move a position of the seam point only up to a position of the other point to prevent the sewn line from collapsing.

When moving, on the SL, the seam point at the end of the SL connected to the CDL by sewing in response to a length of the CDL being changed by the CDP, the garment simulation apparatus may move the seam point to a predetermined distance based on a length ratio of the SL. The predetermined distance may be calculated based on, for example, (norm(length (dv) of CDL deformed by input*length ratio of SL).

For example, as shown in a box 950, an input 951 may be connected with one end of at least one sewn line 955 of a 2D sleeve pattern 957 connected together by sewing, and the input 951 may be sewn on a seam point 955-4 between both ends of the sewn line 955. In this example, in response to a length of a sleeve line of a front-side pattern 954 being changed by the input 951 moving to a second position 953, the garment simulation apparatus may move a position of the seam point 955-4 to another position 955-1, 955-2, 955-3, 955-5, 955-6, or 955-7 moved to the predetermined distance based on the length ratio of the sewn line.

Figure 10:
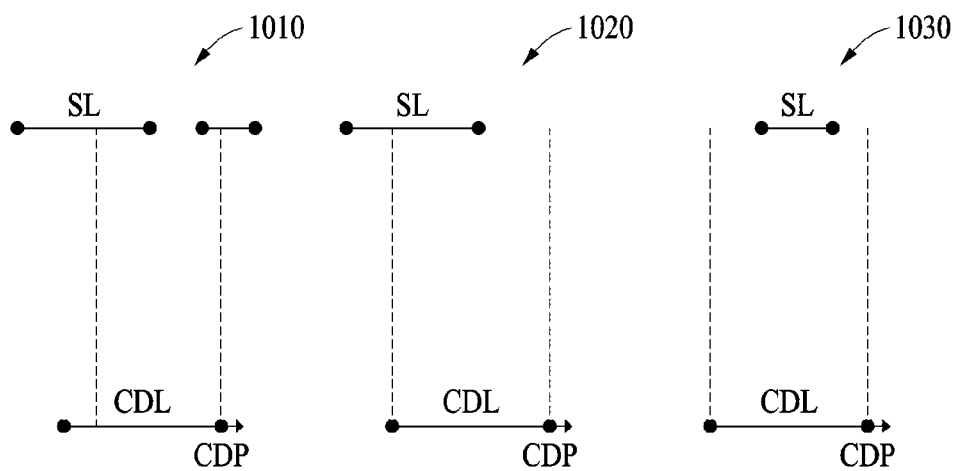

Referring to FIG. 10, as indicated by reference numerals 1010, 1020, and 1030, a CDL is sewn on another line or another sewn line instead of an SL of a 2D pattern connected to each other by sewing. For example, when an input (CDP) is sewn on another line instead of at least one SL connected by sewing among candidate lines as indicated by the reference numeral 1010, when the input is not sewn on any line as indicated by the reference numeral 1020, or when the input moves between both ends of an SL as indicated by the reference numeral 1030, the garment simulation apparatus may maintain a length of the SL without changing. This is because, even if the length of the SL is not changed in the above situations, it can be solved by changing a length of a line connected to a sewn line in a process of processing the line connected to the SL later.

Figure 11:
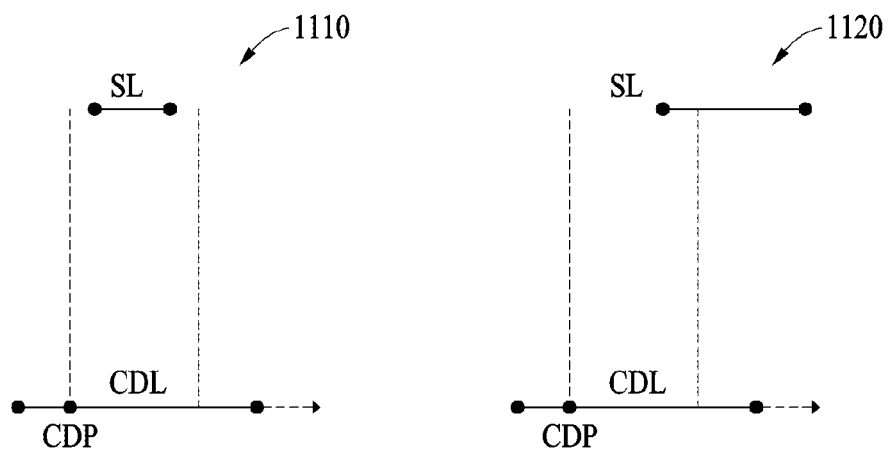
Figure 11:
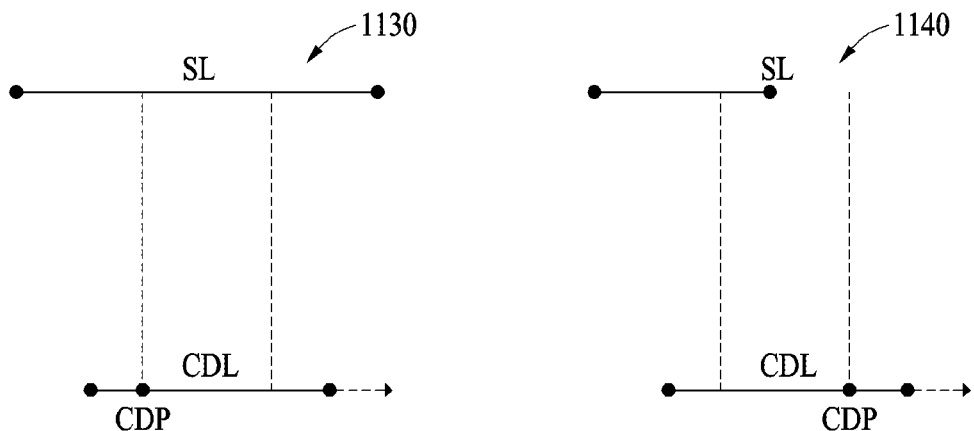

Likewise, even when an input (CDP) is not sewn on an SL or an SLP, the garment simulation apparatus may maintain a length of a sewn line without changing as indicated by reference numerals 1110, 1120, 1130, and 1140 of FIG. 11.

Figure 12:
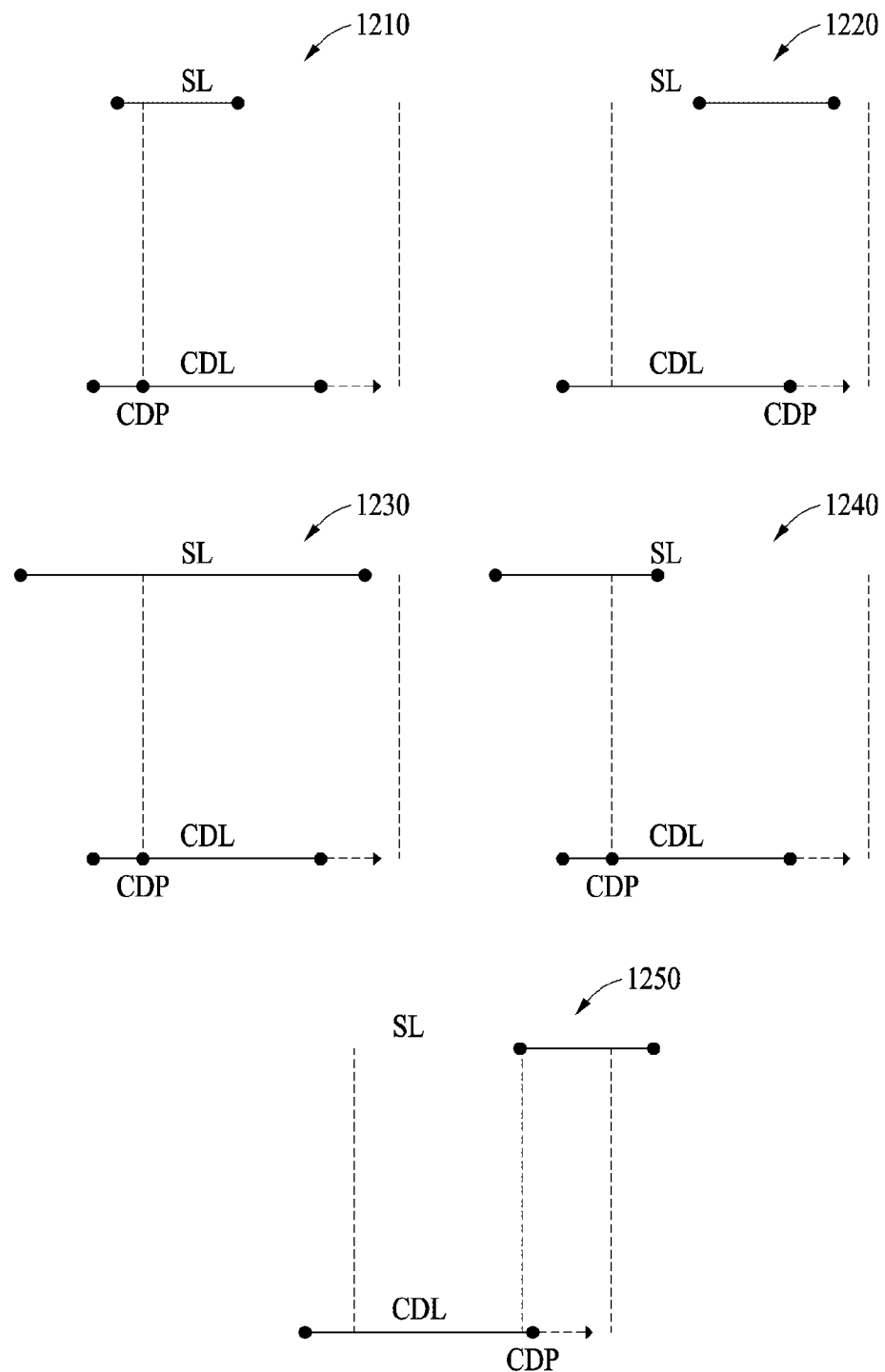

In addition, when an input (CDP) moves between both ends of an SL as indicated by reference numerals 1210, 1220, 1230, and 1240 of FIG. 12, or when one point on a CDL and a point on a line other than the SL are connected by sewing as indicated by reference numeral 1250 of FIG. 12, the garment simulation apparatus may maintain a length of the SL without changing.

Figure 13:
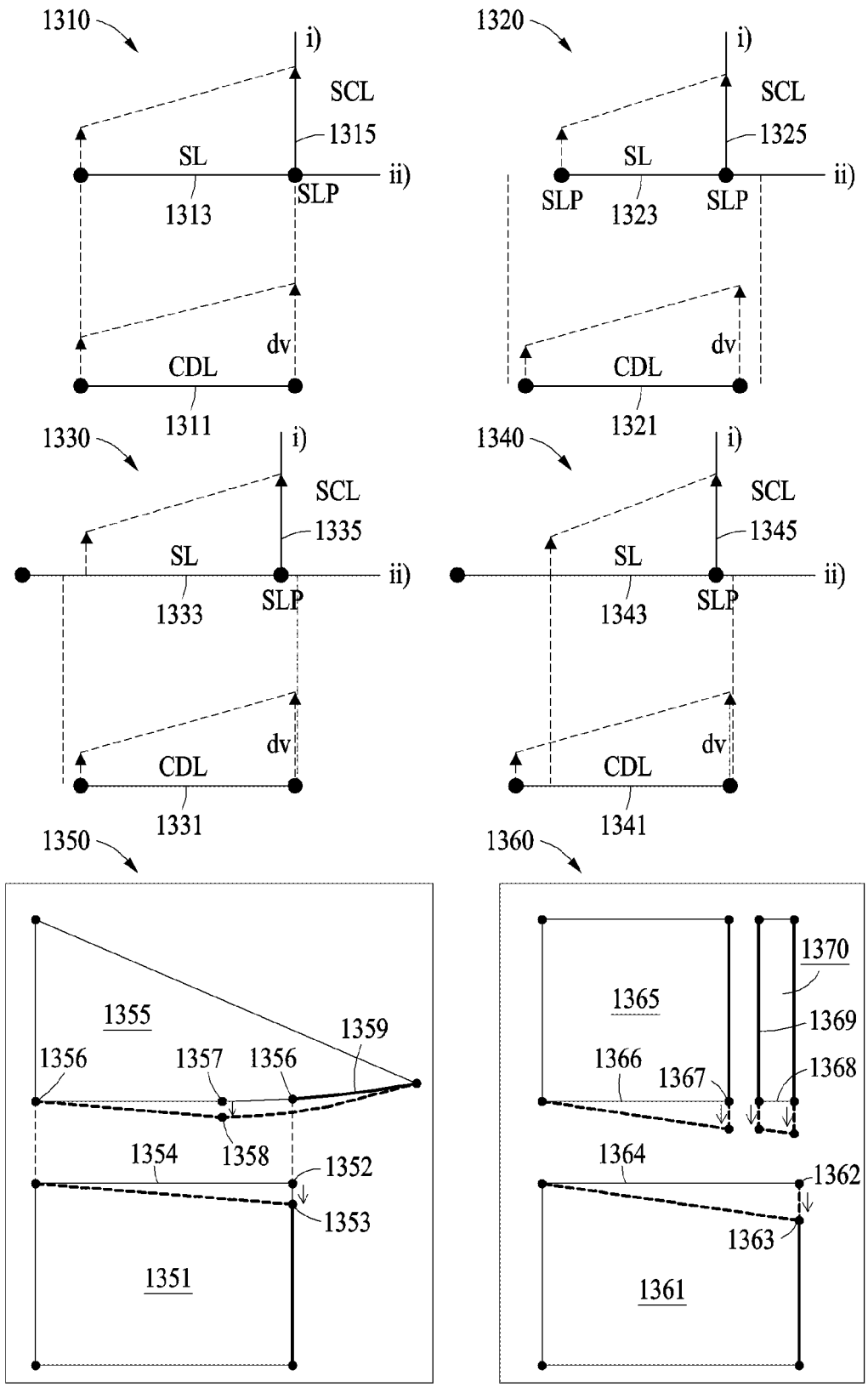
FIGS. 13 and 14 are diagrams illustrating a method of determining an area change in a 2D pattern including a line corresponding to a style line, according to example embodiments.
Figure 14:
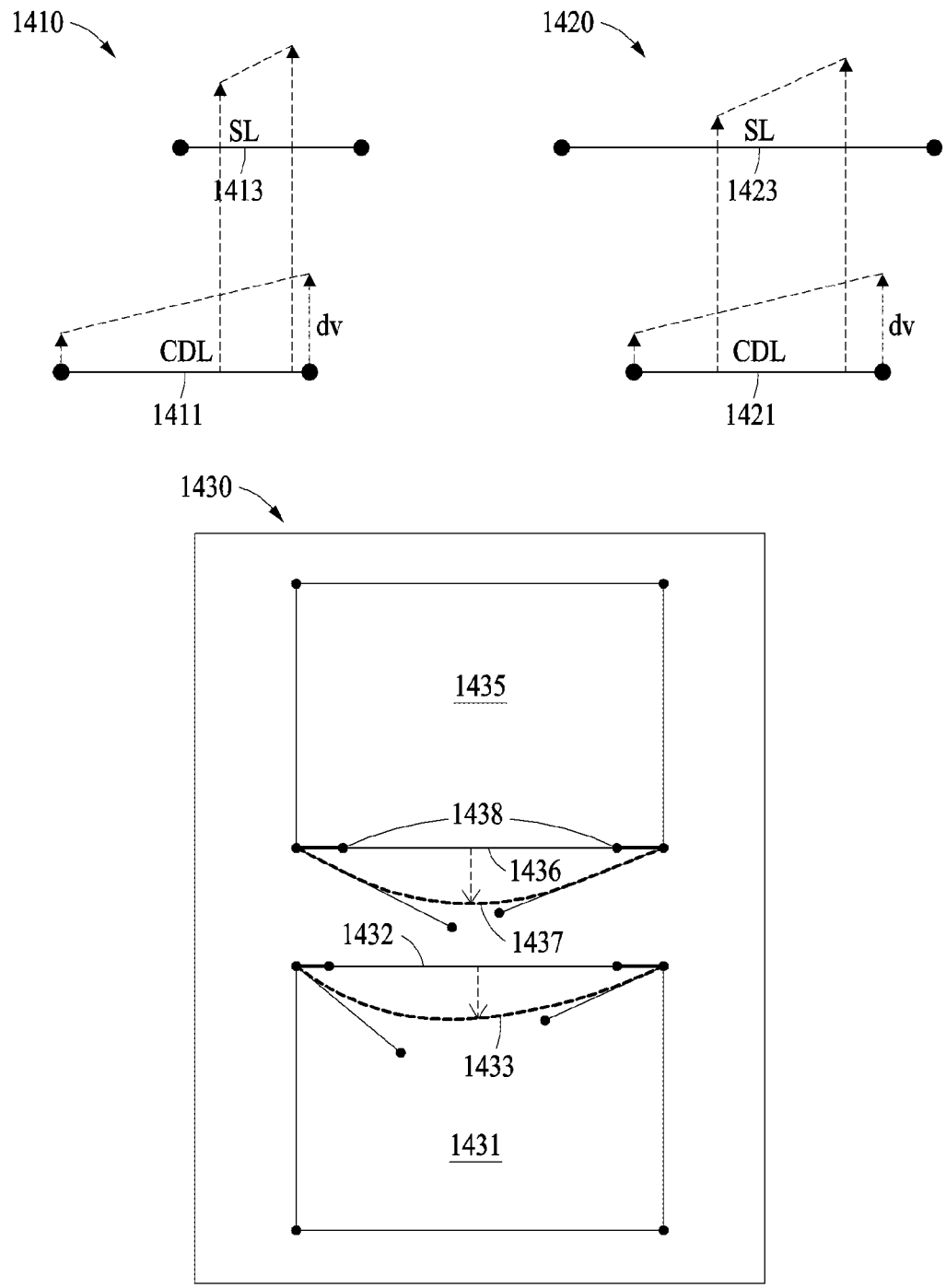

FIGS. 13 and 14 are diagrams illustrating a method of reflecting an area change occurring in a 2D pattern including a line corresponding to a style line due to an input of deforming the style line according to example embodiments. Referring to FIG. 13, as indicated by reference numerals 1310, 1320, 1330, and 1340, CDLs 1311, 1321, 1331, and 1341 currently changed by an input are sewn on SLP(s) located on SLs 1313, 1323, 1333, and 1343 of 2D patterns connected by sewing according to an example embodiment.

As indicated by the reference numerals 1310, 1320, 1330, and 1340, variations (dv) of the CDLs 1311, 1321, 1331, and 1341 may be propagated to the SLs 1313, 1323, 1333, and 1343. Since the variations (dv) are not parallel to the SLs 1313, 1323, 1333, and 1343, an area change is applied to the SLs 1313, 1323, 1333, and 1343. For example, deformation of the SLs 1313, 1323, 1333, and 1343 may be determined such that an area variation generated due to the deformation of the SLs 1313, 1323, 1333, and 1343 is substantially equalized to an area variation generated due to deformation of the CDLs 1311, 1321, 1331, and 1341.

In addition, the garment simulation apparatus may add one or more lines 1315, 1325, 1335, and 1345 connected with the SLs 1313, 1323, 1333, and 1343 through a length change. For example, as shown in a box 1350, a CDL 1354 may be deformed by moving a position of a point 1352 to a second position 1353 on a 2D pattern 1351, and the point 1352 may be sewn on an SLP 1356 on an SL of a 2D pattern 1355. In this example, the SL may include a first sewn line between a first end point 1356 and a notch 1357, a second sewn line between the notch 1357 and the SLP 1356, and a third sewn line 1359 between the SLP 1356 and a second end point.

A deformation direction (a direction from the point 1352 to the second position 1353) of the CDL 1354 may be propagated to the SL, and an area change may be applied to the first to third sewn lines. In this instance, deformation of the first to third sewn lines may be determined such that a sum of area variations generated due to the deformation of the first to third sewn lines is substantially equalized to an area variation generated due to deformation of the CDL 1354.

Alternatively, as shown in a box 1360, a seam point 1367 on at least one sewn line 1366 of a second pattern 1365 connected to a first pattern 1364 by sewing may be sewn on a deformed line 1364 on a first pattern 1361. In this example, an SCL connected to the seam point 1367 may include an SCL 1368 and an SCL 1369. The SCL 1369 connected to the seam point 1367 may be parallel to a deformation direction of a deformed line 1363 while the SCL 1368 is not parallel with a position in which the deformed line 1363 is changed. In this case, in response to the point 1362 of the deformed line 1364 being changed to a point on the deformed line 1363 by an input, the garment simulation apparatus may apply a length change to the SCL 1369 connected to the seam point 1367 and apply an area change to the SCL 1368.

Referring to FIG. 14, as indicated by reference numerals 1410 and 1420, end points on SLs 1413 and 1423 of 2D patterns connected by sewing are not sewn on CDLs 1411 and 1421 currently changed by an input, according to an example embodiment.

As indicated by the reference numerals 1410 and 1420, when the end points on the SLs 1413 and 1423 are not sewn on the CDLs 1411 and 1421, the garment simulation apparatus may deform internal curves of the 2D patterns including the CDLs 1411 and 1421 and the SLs 1413 and 1423.

In response to the CDLs 1411 and 1421 being deformed by an input, the garment simulation apparatus may deform the 2D patterns including the CDLs 1411 and 1421 and internal curves of 2D patterns sewn on the corresponding patterns, thereby changing areas of the 2D patterns including the CDLs 1411 and 1421 and other 2D patterns sewn on the corresponding patterns.

For example, as shown in a box 1430, end points 1438 on an SL 1436 of a 2D pattern 1435 connected by sewing to a 2D pattern 1431 including a CDL 1432 deformed by an input may not be sewn on a CDL 1432. In this example, in response to a position of the CDL 1432 being changed by the input, the garment simulation apparatus may deform internal curves 1433 and 1437 of a 2D pattern 1431 including the CDL 1432 and a 2D pattern 1435 sewn on the 2D pattern 1431, thereby changing areas of the 2D patterns including the CDLs 1411 and 1421 and other 2D patterns sewn on the corresponding patterns.

Figure 15:
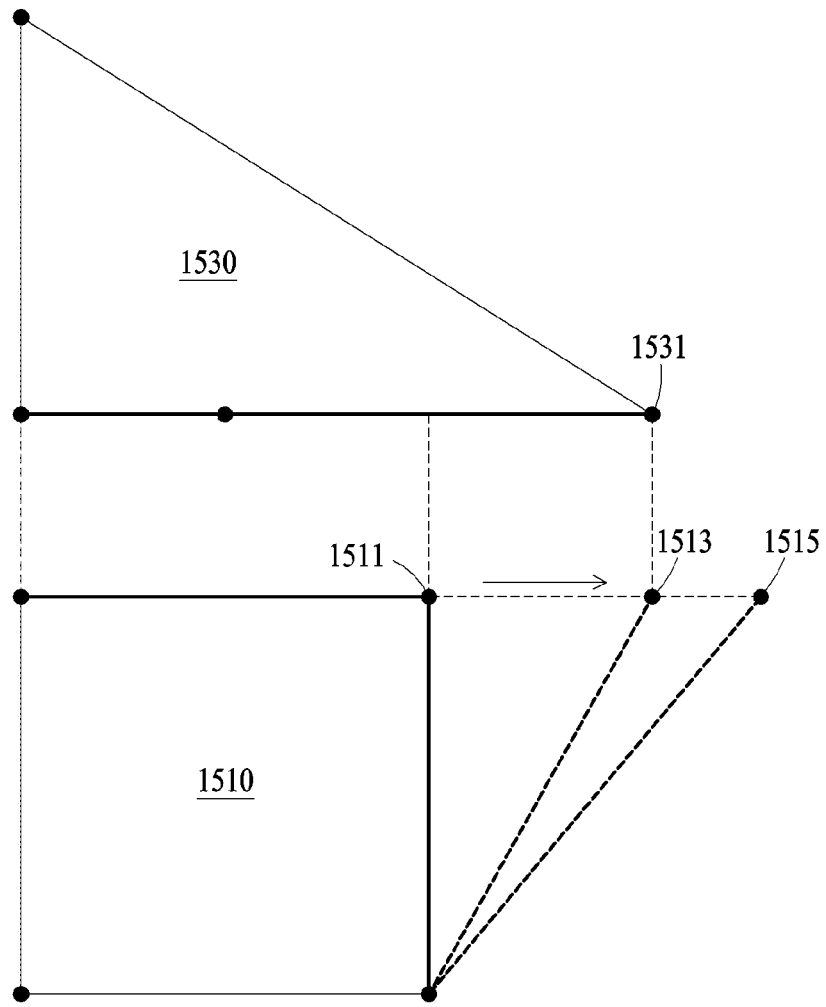
FIG. 15 is a diagram illustrating a size change of a 2D pattern due to restricting deforming of a style line, according to an example embodiment.

FIG. 15 is a diagram illustrating a size change of a 2D pattern due to an input of deforming a style line being restricted, according to an example embodiment. FIG. 15 illustrates a first pattern 1510 and a second pattern 1530 connected to each other by sewing according to an example embodiment. The first pattern 1510 and the second pattern 1530 may correspond to 2D patterns.

For example, a user may click a point 1511 of the first pattern 1510 corresponding to a style line of a 3D garment and move the point 1511 to a first position 1513 or a second position 1515. In this example, a garment simulation apparatus may allow the point 1511 to move to the first position 1513 corresponding to a position of an end point 1531 of the second pattern 1530 sewn together. The garment simulation apparatus may disallow the point 1511 to move to the second position 1515 farther than the first position 1513 corresponding to the end point 1531 of the second pattern 1530.

When a seam point on another 2D pattern connected to a 2D pattern including a straight-line point is snapped while the straight-line point on a style line moves in response to a user input, when a straight-line point on another 2D pattern connected to a 2D pattern including a seam point is snapped while the seam point moves, when a line is broken due to an input of changing a style line, or when a straight-line point is snapped, the garment simulation apparatus may restrict a moving distance or a positional change due to an input.

Figure 16:
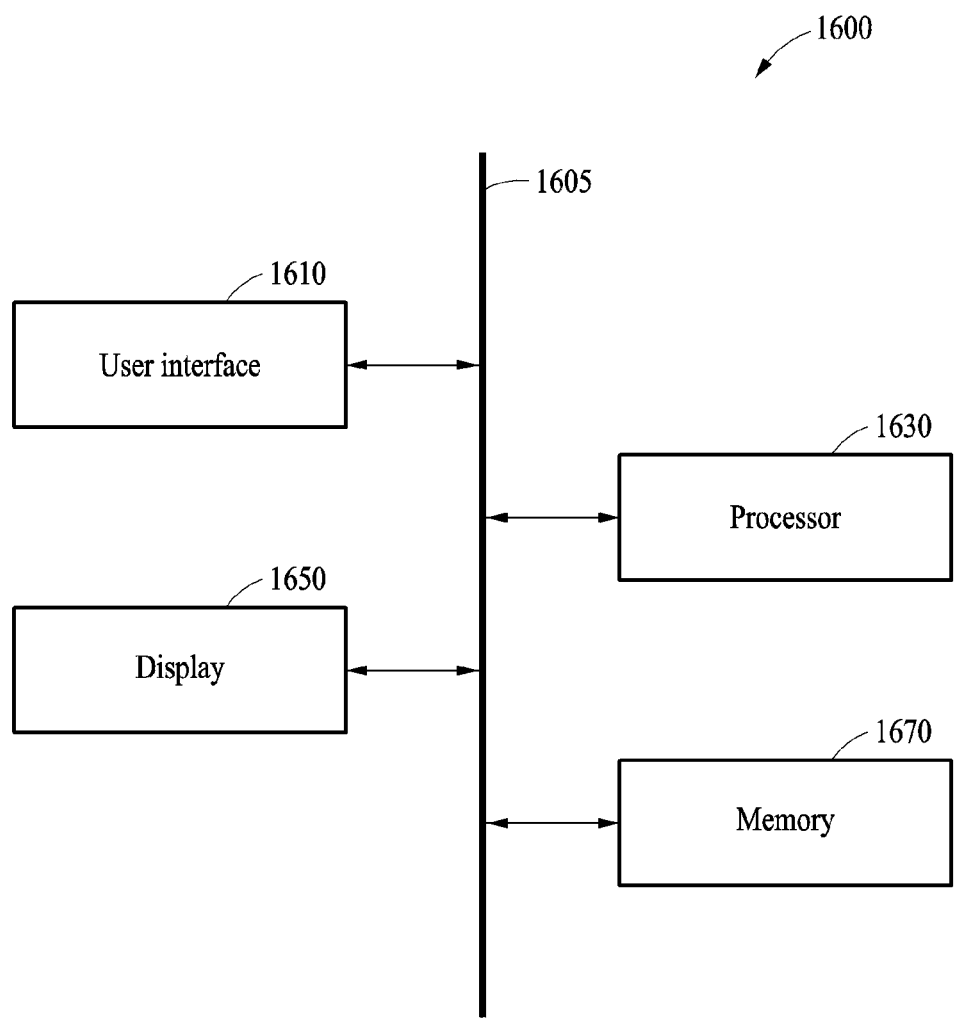
FIG. 16 is a block diagram illustrating a garment simulation apparatus, according to an example embodiment.

FIG. 16 is a block diagram illustrating a garment simulation apparatus according to an example embodiment. Referring to FIG. 16, a garment simulation apparatus 1600 may include a user interface 1610, a processor 1630, a display 1650, and a memory 1670. The user interface 1610, the processor 1630, the display 1650, and the memory 1670 may be connected to one another through a communication bus 1605.

The user interface 1610 represents a 3D garment. The user interface 1610 may receive an input for changing at least one style line among a plurality of style lines representing a style of the 3D garment. The user interface 1610 may receive a user input on a 3D garment represented in a 3D space through a stylus pen or a mouse click, for example.

The processor 1630 may identify a first line corresponding to a style line among a plurality of lines included in a 2D pattern corresponding to the 3D garment represented through the user interface 1610. The processor 1630 may deform the first line based on the input received through the user interface 1610. The processor 1630 may deform the 2D pattern corresponding to the 3D garment by propagating deformation of the first line to candidate lines associated with the first line. The processor 1630 may perform a simulation based on the deformed 2D pattern.

The display 1650 may display at least one of the 2D pattern deformed by the processor 1630 and a 3D garment in which the style line is deformed based on the 2D pattern deformed by the processor 1630. The display 1650 may display, through the user interface, the 3D garment in which the style line is deformed through the simulation performed by the processor 1630.

The memory 1670 may store a position to which the input of deforming the style line received through the user interface 1610 is moved. The memory 1670 may store a deforming line list including the candidate lines associated with the first line. The memory 1670 may store the deformed 2D pattern to correspond to the 3D garment in which the style line is deformed.

In addition, the memory 1670 may store a variety of information generated in a processing operation of the processor 1630 described above. Also, the memory 1670 may store a variety of data and programs, and the like. The memory 1670 may include, for example, a volatile memory or a nonvolatile memory. The memory 1670 may include a massive storage medium such as a hard disk to store a variety of data.

In addition, the processor 1630 may perform at least one of the methods described above with reference to FIG. 1 through FIG. 15 or an algorithm corresponding to at least one of the methods. The processor 1630 may be a hardware-implemented data processing device having a circuit that is physically structured to execute desired operations. For example, the desired operations may include code or instructions included in a program. The processor 1630 may be configured as, for example, a central processing unit (CPU), a graphics processing unit (GPU), or a neural network processing unit (NPU). The garment simulation apparatus 1600 implemented as hardware may include, for example, a microprocessor, a CPU, a processor core, a multi-core processor, a multiprocessor, an application-specific integrated circuit (ASIC), and a field-programmable gate array (FPGA).

The processor 1630 may execute a program and control the garment simulation apparatus 1600. Codes of the program executed by the processor 1630 may be stored in the memory 1670.

The methods according to the above-described example embodiments may be embodied by the processor executing instructions stored in non-transitory computer-readable media including program instructions. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Embodiments also relate to a digital representation of a garment generated using the method described above. The digital representation may be used to manufacture physical goods or it may be used for used for generating virtual clothes used in virtual reality, augmented reality or other digital environment (e.g., games). Such digital representation may be stored in a non-transitory computer readable storage medium.

Software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of simulating a garment, the method comprising:
   receiving an input indicative of deformation of at least one style line representing a line on a three-dimensional garment for modifying a shape of the three-dimensional garment;
   identifying a first line corresponding to the style line among a plurality of lines in a two-dimensional pattern of the three-dimensional garment;
   deforming the first line in the two-dimensional pattern according to the received input;
   propagating deformation in line with the deformation of the first line to candidate lines associated with the first line so that a sum of areas of two-dimensional patterns in the three-dimensional garment affected by the deformation of the first line is substantially conserved after the deformation of the first line; and
   displaying at least one of a deformed version of the two-dimensional pattern or a deformed version of the three-dimensional garment reflecting the deformed first line and the propagated deformation.

2. The method of claim 1, wherein the deformed version of the three-dimensional garment maintains a shape of the three-dimensional garment before the deformation.

3. The method of claim 1, wherein the candidate lines comprise at least one of:
   a second line symmetrical to the first line included in a same pattern or is copied from the first line; or
   a sewn line connected to at least one of the first line or the second line by sewing.

4. The method of claim 1, wherein propagating the deformation comprises:
   generating a deforming line list comprising the deformed first line and the candidate lines associated with the first line; and
   deforming the two-dimensional pattern based on the deforming line list.

5. The method of claim 4, wherein the generating of the deforming line list comprises:
   generating a deforming line list comprising the deformed first line;
   deforming the candidate lines by propagating the deformation of the first line; and
   storing the deformed candidate lines in the deforming line list.

6. The method of claim 5, wherein the deforming of the candidate lines comprises:
   searching for the candidate lines deformed in associated with the deformed first line.

7. The method of claim 6, wherein the searching for the candidate lines comprises:
   searching for at least one sewn line connected, by sewing, to each of lines stored in the deforming line list.

8. The method of claim 7, wherein the deforming of the two-dimensional pattern comprises:
   changing an area of at least one pattern comprising the sewn line or a length of the sewn line according to deformation of one or more candidate lines connected to the sewn line.

9. The method of claim 6, wherein the searching for the candidate lines comprises:
   searching for a second line that is symmetrical to the first line or copied from the first line.

10. The method of claim 5, wherein deforming of the two-dimensional pattern comprises:
    moving a seam point at an end of a sewn line by a predetermined distance based on a length ratio of the sewn line and a length of the first line responsive to the input indicating one end of a sewn line.

11. The method of claim 4, wherein the generating of the deforming line list comprises:
    generating the deforming line list based on whether at least one of a length, a shape, and a curvature of the first line is changed by the input.

12. The method of claim 4, wherein the generating of the deforming line list comprises:

adding lines contacting a vertex of the two-dimensional pattern to the deforming line list responsive to the input corresponding to the vertex; and adding the deformed first line to the deforming line list responsive to the input corresponding to a point that is not the vertex.

13. The method of claim 4, wherein the deforming of the two-dimensional pattern comprises:

changing at least one of a length of a sewn line and a length of a line connected to the sewn line responsive to the input indicating a point that is connected to an end of the sewn line.

14. The method of claim 13, further comprising:

determining whether the sewn line or the line connected to the sewn line extends parallel to a moving direction indicated by the input;

changing the length of the sewn line and the length of at least one line connected to the sewn line in response to the moving direction being parallel to the sewn line and the line connected to the sewn line; and changing the length of the sewn line in response to the sewn line and the at least one line connected to the sewn line not being parallel to the moving direction.

15. The method of claim 4, wherein deforming of the two-dimensional pattern comprises maintaining a length of a sewn line responsive to a point indicated by the input is part of the two-dimensional pattern sewn onto a line other than the candidate lines connected by sewing or the point indicated by the input moving between two ends of the sewn line.

16. The method of claim 4, wherein the deforming of the two-dimensional pattern comprises changing a length of at least one line connected to a seam point in accordance with a length change of the first line responsive to satisfying predetermined conditions.

17. The method of claim 4, wherein deforming of the two-dimensional pattern comprises:

changing areas of the pattern and another pattern sewn onto the pattern by deforming internal curves of the pattern and the other pattern sewn in response to a length change of the first line by the input.

18. The method of claim 4, the deforming of the two-dimensional pattern comprises:

changing a position of a seam point on lines changed in length such that a distance between the seam point and a stationary end point among both end points of the lines is substantially maintained, the lines comprising the first line.

19. The method of claim 4, wherein when a length of the first line is reduced by the input, deforming of the two-dimensional pattern comprises:

connecting a point indicated by the input to a seam point located closest to the point indicated by the input.

20. The method of claim 4, deforming of the two-dimensional pattern comprises:

moving a sewn line to a position of a straight-line point or a seam point adjacent to the seam point responsive to the seam point on the sewn line connected to the candidate lines by sewing being moved.

21. The method of claim 1, wherein the input indicates a movement along the first line with a change in a direction that is orthogonal to the first line, and wherein a moving distance of a point indicated by the input is limited to a predetermined distance.

22. The method of claim 1, wherein responsive to the input indicating a movement within of a two-dimensional pattern of the three-dimensional garment, the deforming of the first line comprises:

determining two-dimensional coordinates corresponding to the moved position of the input;

determining a two-dimensional positional variation of the input based on the two-dimensional coordinates; and moving a position of the first line of the first pattern based on the two-dimensional positional variation.

23. The method of claim 1, wherein responsive to the input indicating a movement outside a two-dimensional pattern of the three-dimensional garment, the deforming of the first line comprises:

determining a three-dimensional position movement value of the movement;

determining a transformation matrix corresponding to the three-dimensional positional movement value;

determining a two-dimensional positional variation based on the transformation matrix; and moving a position of the first line of the first pattern based on the two-dimensional positional variation.

24. The method of claim 1, wherein propagating the deformation comprises:

adding the first line to a deforming line list; and applying the deformation of the first line to a line having a symmetrical relationship or instance relationship with the first line, adding the line applied with the deformation to the deforming line list; and for each of lines included in the deforming line list:
acquiring a corresponding line and removing the corresponding line from the deforming line list;
applying deformation of the corresponding line to a sewn line not deformed among lines connected to the corresponding line by sewing;
adding the sewn line to the deforming line list;
applying deformation of the corresponding line to a line having a symmetrical relationship or instance relationship with the sewn line; and
adding the line to the deforming line list.

25. A non-transitory computer-readable storage medium storing instructions that, when executed by a processor, cause the processor to:

receive an input indicative of deformation of at least one style line representing a line on a three-dimensional garment for modifying a shape of the three-dimensional garment;

identify a first line corresponding to the style line among a plurality of lines in a two-dimensional pattern of the three-dimensional garment;

deform the first line in the two-dimensional pattern according to the received input;

propagate deformation in line with the deformation of the first line to candidate lines associated with the first line so that a sum of areas of two-dimensional patterns in the three-dimensional garment affected by the deformation of the first line is substantially conserved after the deformation of the first line; and display at least one of a deformed version of the two-dimensional pattern or a deformed version of the three-dimensional garment reflecting the deformed first line and the propagated deformation.

* * * * *